United States Patent
Stiesdal et al.

(10) Patent No.: US 8,505,589 B2
(45) Date of Patent: Aug. 13, 2013

(54) ARRANGEMENT AND METHOD FOR THE WIND OF A SINGLE-LAYER-COIL

(75) Inventors: Henrik Stiesdal, Odense C (DK); Martin Winther-Jensen, Haslev (DK)

(73) Assignee: Siemens Aktiengesellschaft, München (DE)

( * ) Notice: Subject to any disclaimer, the term of this patent is extended or adjusted under 35 U.S.C. 154(b) by 1033 days.

(21) Appl. No.: 12/500,106

(22) Filed: Jul. 9, 2009

(65) Prior Publication Data

US 2010/0006173 A1    Jan. 14, 2010

(30) Foreign Application Priority Data

Jul. 10, 2008 (EP) ..................................... 08012543

(51) Int. Cl.
     *B21F 3/00*          (2006.01)
(52) U.S. Cl.
     USPC ........................... 140/92.2; 140/92.1; 72/371
(58) Field of Classification Search
     USPC ............. 29/605; 242/615.1, 437, 440, 440.1, 242/443.1, 444, 445, 445.1; 72/146, 148, 72/371; 140/92.1, 92.2
     See application file for complete search history.

(56) References Cited

U.S. PATENT DOCUMENTS

| | | | |
|---|---|---|---|
| 3,086,562 A | 4/1963 | Price | |
| 4,848,685 A * | 7/1989 | Selva | ........................... 140/92.1 |
| 5,088,184 A * | 2/1992 | Jarabak et al. | ................... 29/605 |
| 2008/0010812 A1* | 1/2008 | Clark | .............................. 29/605 |

FOREIGN PATENT DOCUMENTS

| | | |
|---|---|---|
| CN | 101068088 A | 11/2007 |
| DE | 2528530 A1 | 1/1977 |
| EP | 1852958 A2 | 11/2007 |

* cited by examiner

*Primary Examiner* — Dana Ross
*Assistant Examiner* — Pradeep C Battula (57) ABSTRACT

An arrangement includes a coil-winding-tool to guide a metallic conductor for the forming of a part of the single-layer-coil. The coil-winding-tool is mounted to rotate around a first axis of rotation for the forming of the part of the coil. A conductor-feeding-drum carries the metallic conductor and is designed to hand over the metallic-conductor to the coil-winding-tool for forming. The conductor-feeding-drum is carried by a fixture. The fixture is mounted to rotate around a second axis of rotation, to allow a rotation of the conductor-feeding-drum around the second axis too. The first axis of rotation of the coil-winding-tool is perpendicular to the second axis of rotation of the conductor-feeding-drum, to allow the execution of the winding by the rotation of the coil-winding-tool and by the rotation of the conductor-feeding-drum.

12 Claims, 13 Drawing Sheets

STEP 1

STEP 5

FIG 8
STEP 6

STEP 1

ARRANGEMENT AND METHOD FOR THE WIND OF A SINGLE-LAYER-COIL

CROSS REFERENCE TO RELATED APPLICATIONS

This application claims priority of European Patent Office application No. 0801253.8 EP filed Jul. 10, 2008, which is incorporated by reference herein in its entirety.

FIELD OF INVENTION

The invention relates to an arrangement and a method for the winding of a single-layer-coil.

The invention relates especially to an arrangement and a method for the winding of a so called "out-of-plane" single-layer coil for a large electrical machine.

BACKGROUND OF INVENTION

In large electrical machines it is common to use a so called double-layer winding. This winding type has the benefit that all coils are identical and the coils are easy to manufacture.

However, in electrical machines with a high number of poles and a small pole pitch the traditional double layer windings can be difficult to mount because an insertion of a last coil within dedicated slots require to lift a first coil out of the slots while completing the winding of the coil.

Furthermore, for a segmented electrical machine double layer windings require coils that connect across the segment joint.

It is possible to make single-layer windings that do not require the removal of the first inserted coils when inserting the last coils in a stator. It is also possible to make single-layer windings that do not need to cross segment joints. Consequently, single-layer windings can be advantageous for large electrical machines.

Single-layer windings normally require both in-plane and out-of-plane end windings. The manufacturing of the in-plane end windings is straightforward, but the manufacturing of the out-of-plane end windings is more difficult. This normally comprises the steps of first forming a plane coil and then deforming to the desired out-of-plane shape. This final deformation is intensive in work and may introduce small defects in the insulation due to the relatively large elongations of the material.

The EP 1 852 958 A2 discloses a method for an automated forming of single-layer coils. This method eliminates the majority of drawbacks by traditional forming but it requires a fairly elaborate machine arrangement with a coil winding tool, which rotates around two axes. So this is a complex machine, controlled by complex algorithms.

SUMMARY OF INVENTION

It is aim of the present invention, to provide an arrangement and a method for the winding of a single-layer-coil, which is less complex.

This aim is solved by the features of the independent claims.

Advantageous embodiments of the invention are subject of the dependent claims.

The inventive arrangement inhabits a coil-winding-tool. The coil-winding-tool shows means to guide a metallic conductor for the forming of a part of the single-layer-coil. The coil-winding-tool is mounted to rotate around a first axis of rotation for the forming of the part of the coil. A conductor-feeding-drum carries the metallic conductor and is designed to hand over the metallic-conductor to the coil-winding-tool for forming. The conductor-feeding-drum is carried by a fixture.

The fixture is mounted to rotate around a second axis of rotation, to allow a rotation of the conductor-feeding-drum around the second axis too. The first axis of rotation of the coil-winding-tool is perpendicular to the second axis of rotation of the conductor-feeding-drum, to allow the execution of the winding by the rotation of the coil-winding-tool and by the rotation of the conductor-feeding-drum.

Because of the inventive arrangement it is possible to form the coil in a single continuous process with a minimum of manual handling.

The inventive arrangement can be used to form any particular type of a single-layer-coil, only the size and the shape of the coil-forming-tool has to be adapted.

BRIEF DESCRIPTION OF THE DRAWINGS

The invention is described in more detail by help of the following figures FIG. 1 to FIG. 13.

DETAILED DESCRIPTION OF INVENTION

Figure 1:
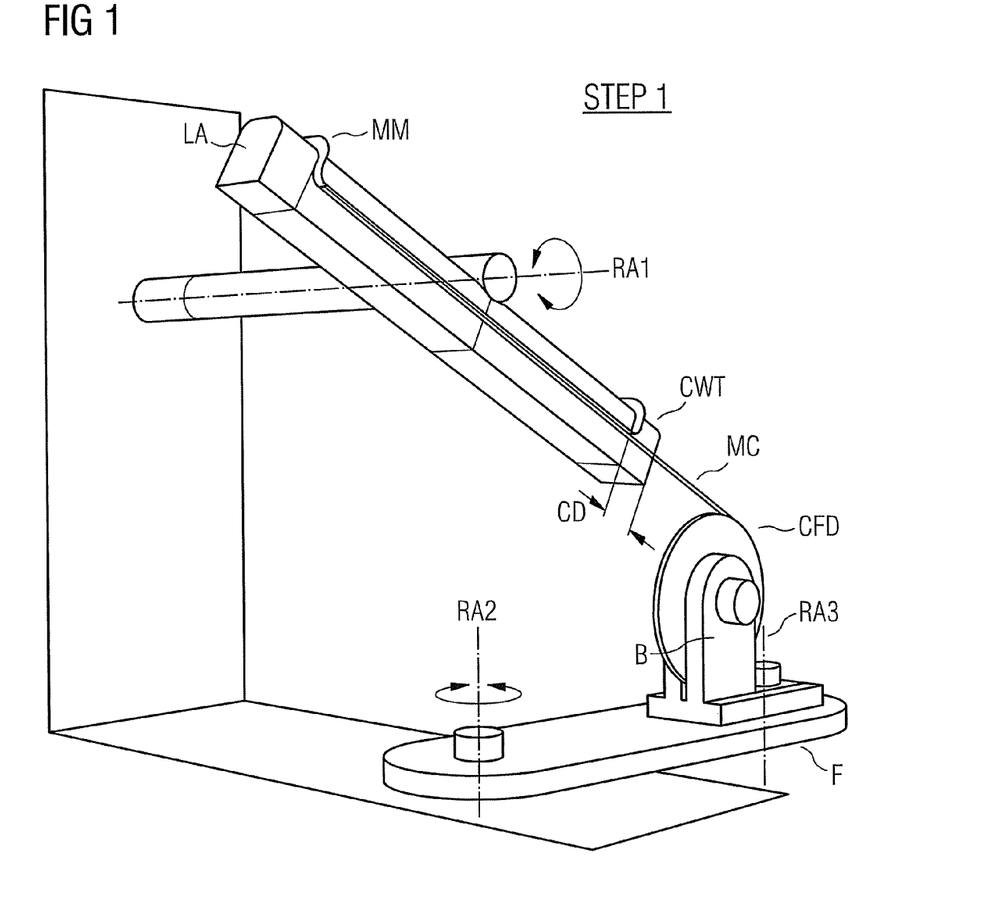
FIG. 1 an embodiment of a coil winding arrangement where a first part of a coil is formed.

Referring to FIG. 1 there is a coil-winding-tool CWT, which is rotatable around a first axis of rotation RA1.

The coil-winding-tool CWT shows a number of means MM to guide a metallic conductor MC to form a part of a single-layer-coil.

There is a conductor-feeding-drum CFD, which carries the metallic conductor MC. The conductor-feeding-drum CFD is mounted on a bracket B. The bracket B is carried by a fixture F. The fixture F and so the conductor-feeding-drum CFD, too, are rotatable around a second axis of rotation RA2.

The first axis of rotation RA1 of the coil-winding-tool CWT is perpendicular to the second axis of rotation RA2 of the conductor-feeding-drum CFD.

The coil-winding-tool CWT itself has a longitudinal axis LA, which is perpendicular to the first axis of rotation RA1 of the coil-winding-tool CWT.

The bracket B of the conductor-feeding-drum CFD is rotatable around a third axis of rotation RA3, which is parallel to the second axis of rotation RA2.

For the completion of one turn of the coil-winding the following steps STEP 1 up to STEP 8 has to be done:

Referring to FIG. 1 there is a forming of a first side of the coil. A substantially straight part of the coil is formed by leading the metallic conductor MC by the means MM.

This straight part of the coil will be located later within a slot of the machine. To be aware of this a certain distance CD has to be formed by actively turning the coil-winding-tool CWT around the first axis of rotation RA1 by a suitable arc.

Figure 2:
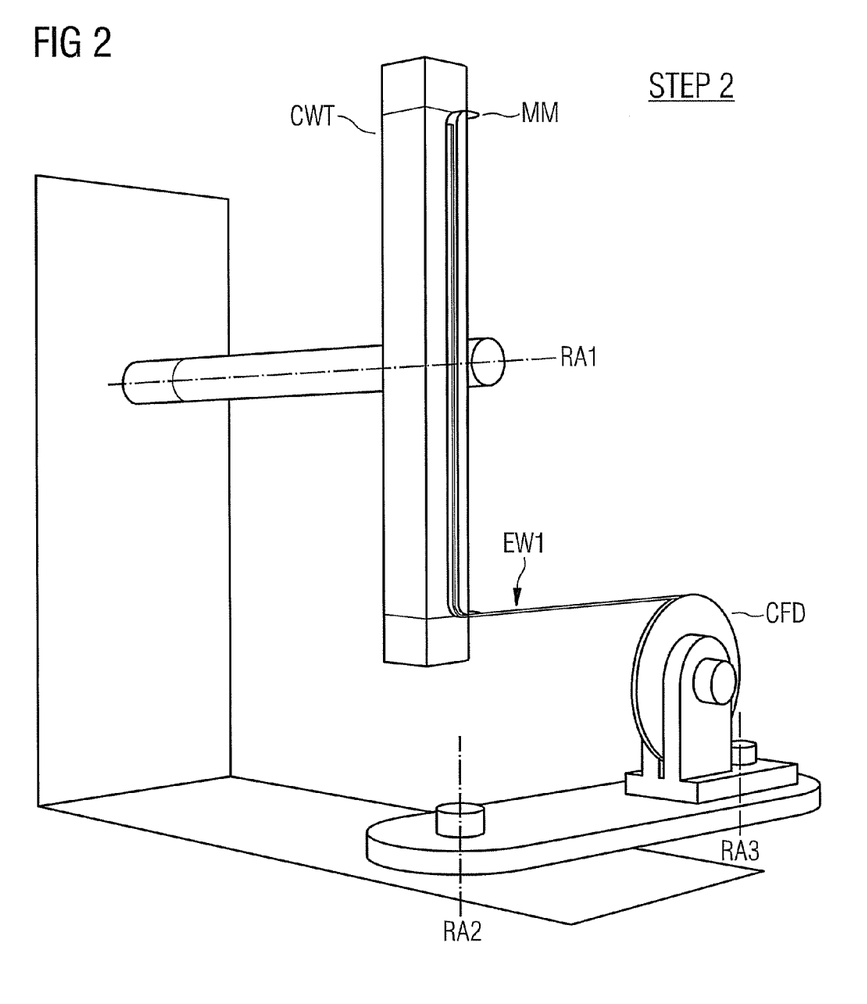
FIG. 2-13 a schematic of the coil winding arrangement where further parts of the coil are formed.

Referring to FIG. 2 a first part EW1 of an out-of-plane end-winding is formed by further actively turning the coil-winding-tool CWT around the first axis of rotation RA1 through a suitable arc.

Figure 3:
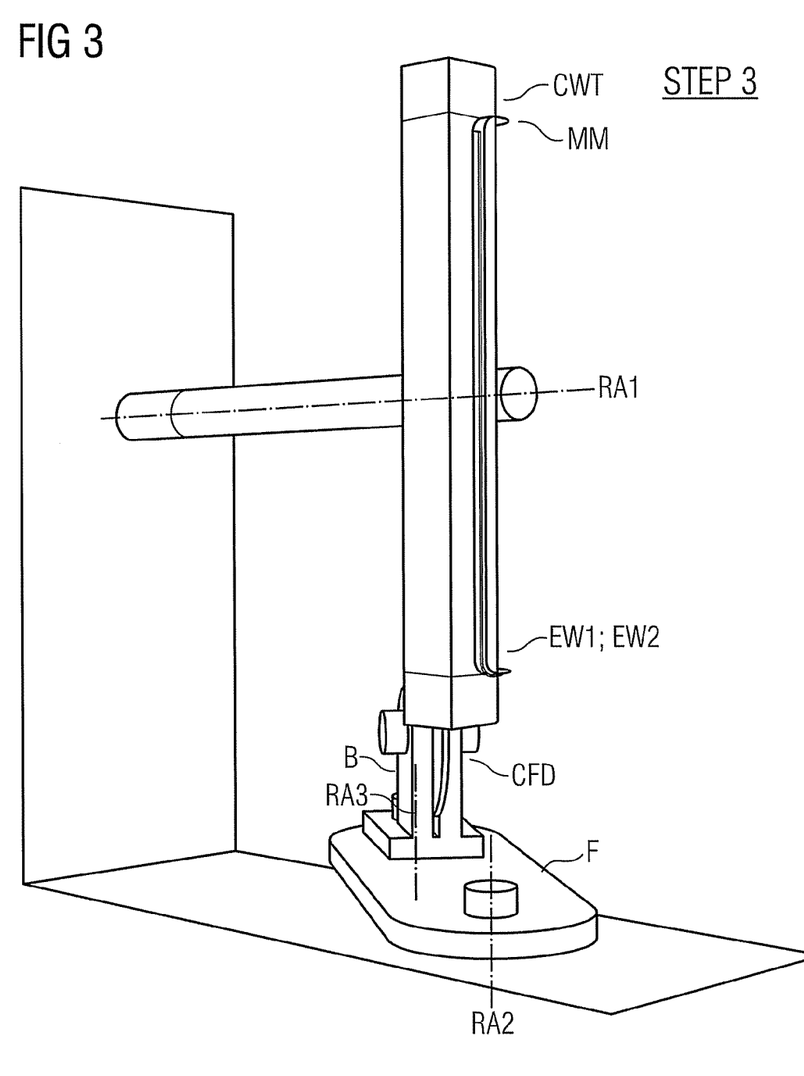

Referring to FIG. 3 a second part EW2 of the out-of-plane end-winding is formed by actively turning the conductor-feeding-drum CFD via the fixture F around the second axis of rotation RA2 through a suitable arc.

During this process the bracket B of the conductor-feeding-drum CFD will passively adjust by rotation around the third axis of rotation RA3.

Figure 4:
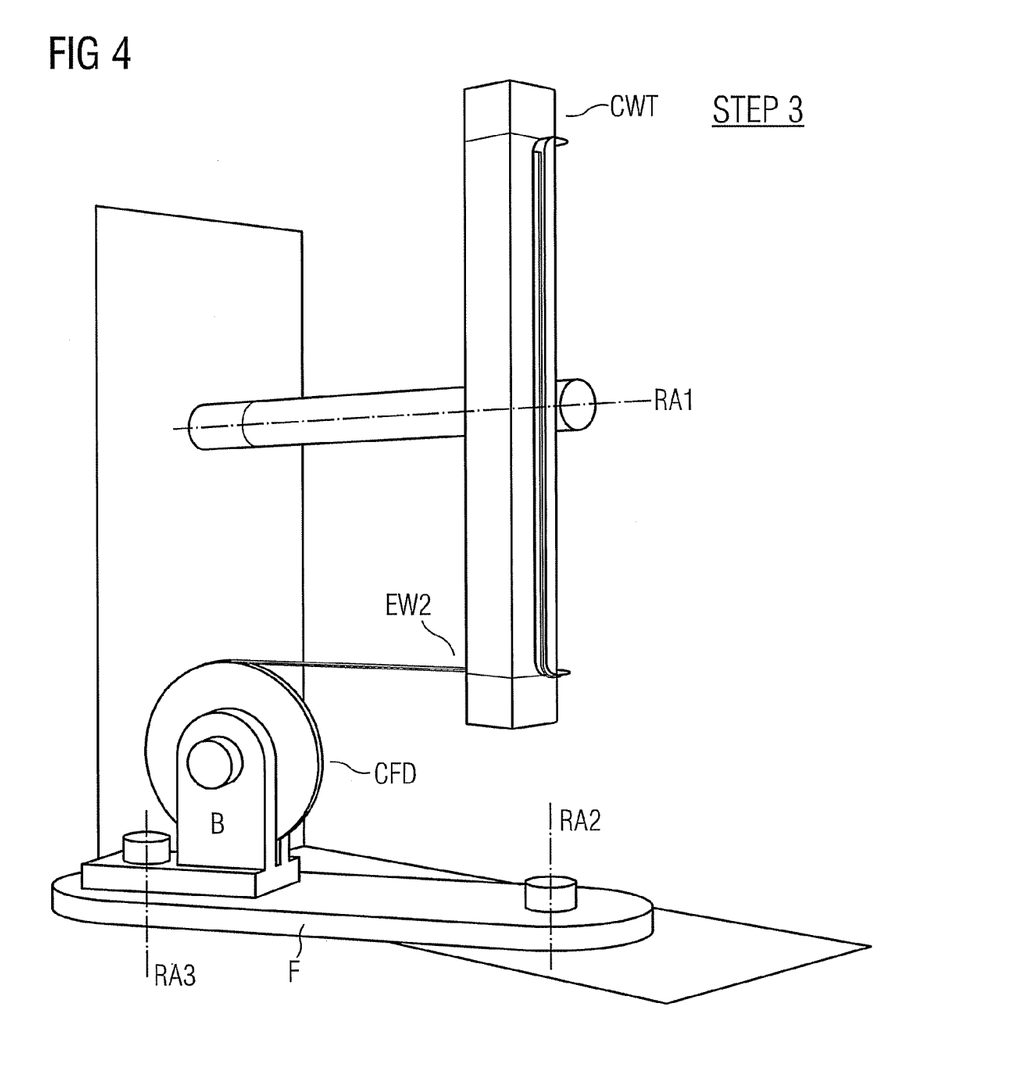
Figure 5:
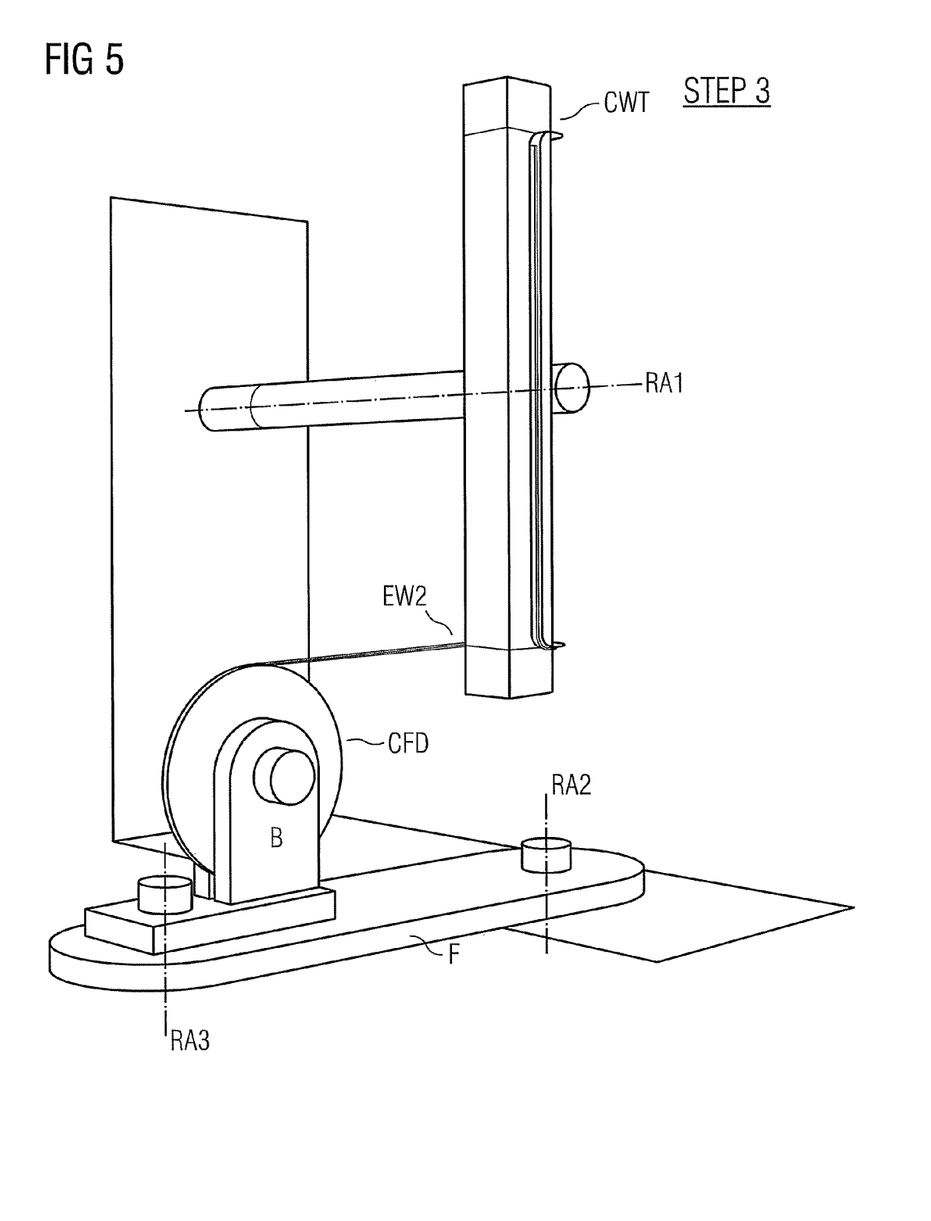

Referring to FIG. 4 and FIG. 5 the second part EW2 of the out-of-plane end-winding is formed by further actively turning the conductor-feeding-drum CFD via the fixture F around the second axis of rotation RA2 through a suitable arc.

During this process the bracket B of the conductor-feeding-drum CFD will passively adjust by rotation around the third axis of rotation RA3.

Figure 6:
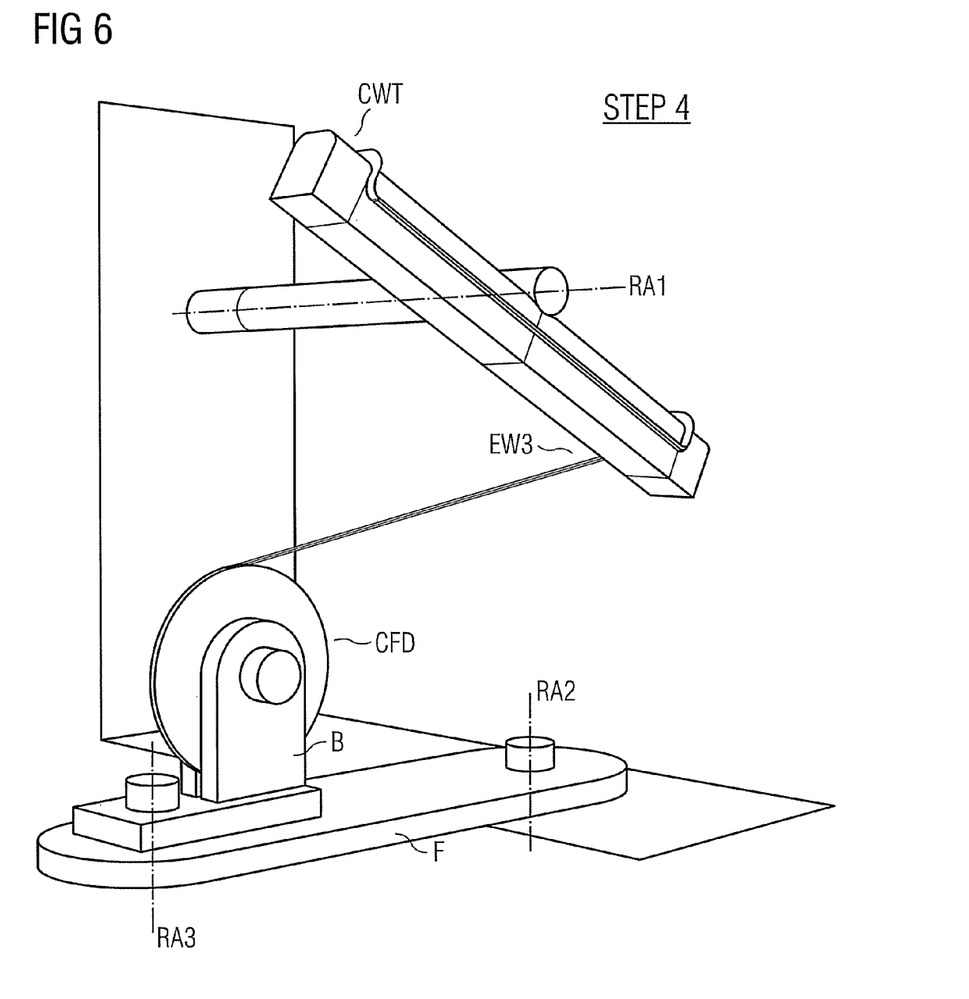

Referring to FIG. 6 a third part EW3 of the out-of-plane end-winding is formed by further actively turning the coil-winding-tool CWT around the first axis of rotation RA1 through a suitable arc. The direction of this turning is opposite to the direction of turning as described in FIG. 1 above.

Figure 7:
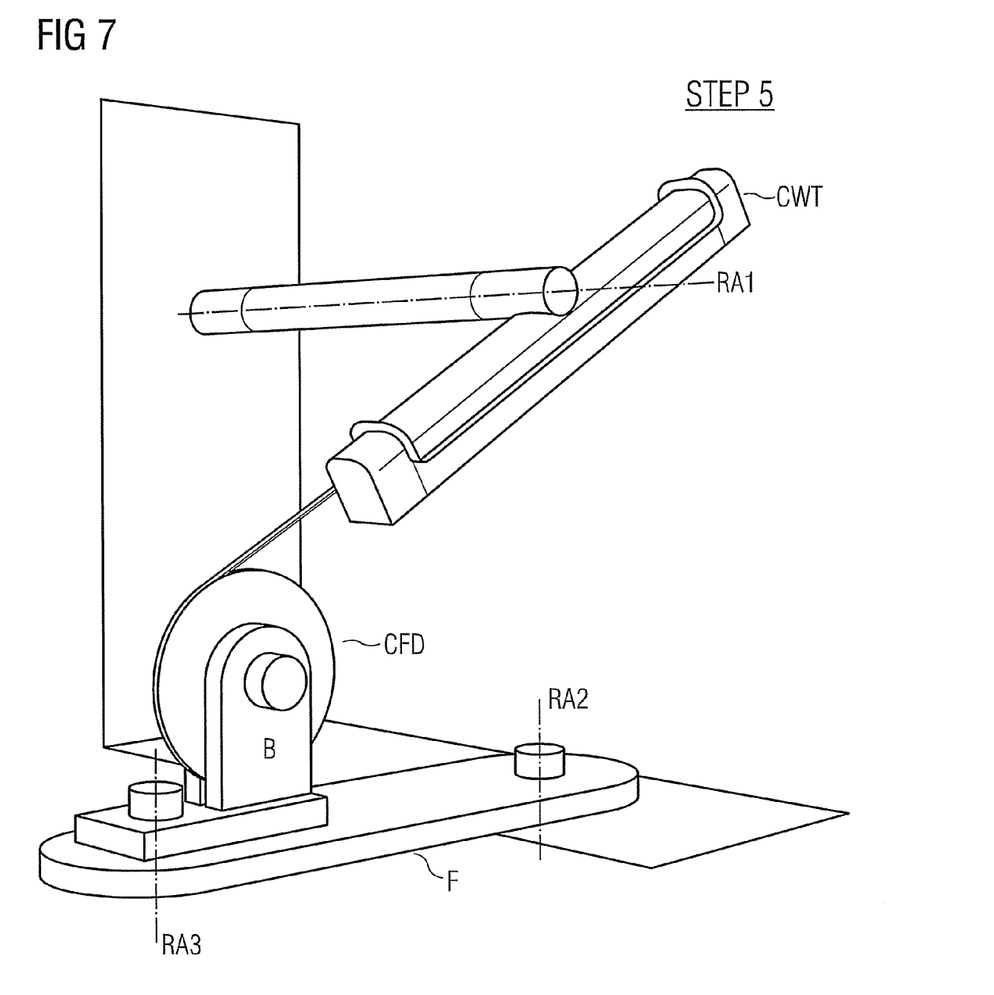

Referring to FIG. 7 a second side of the coil is formed. This straight part of the coil will be located later within a slot of the machine.

To be aware of this another certain distance has to be formed by actively turning the coil-winding-tool CWT around the first axis of rotation RA1 by a suitable arc.

The direction of this turning is the same as described in FIG. 1.

Figure 8:
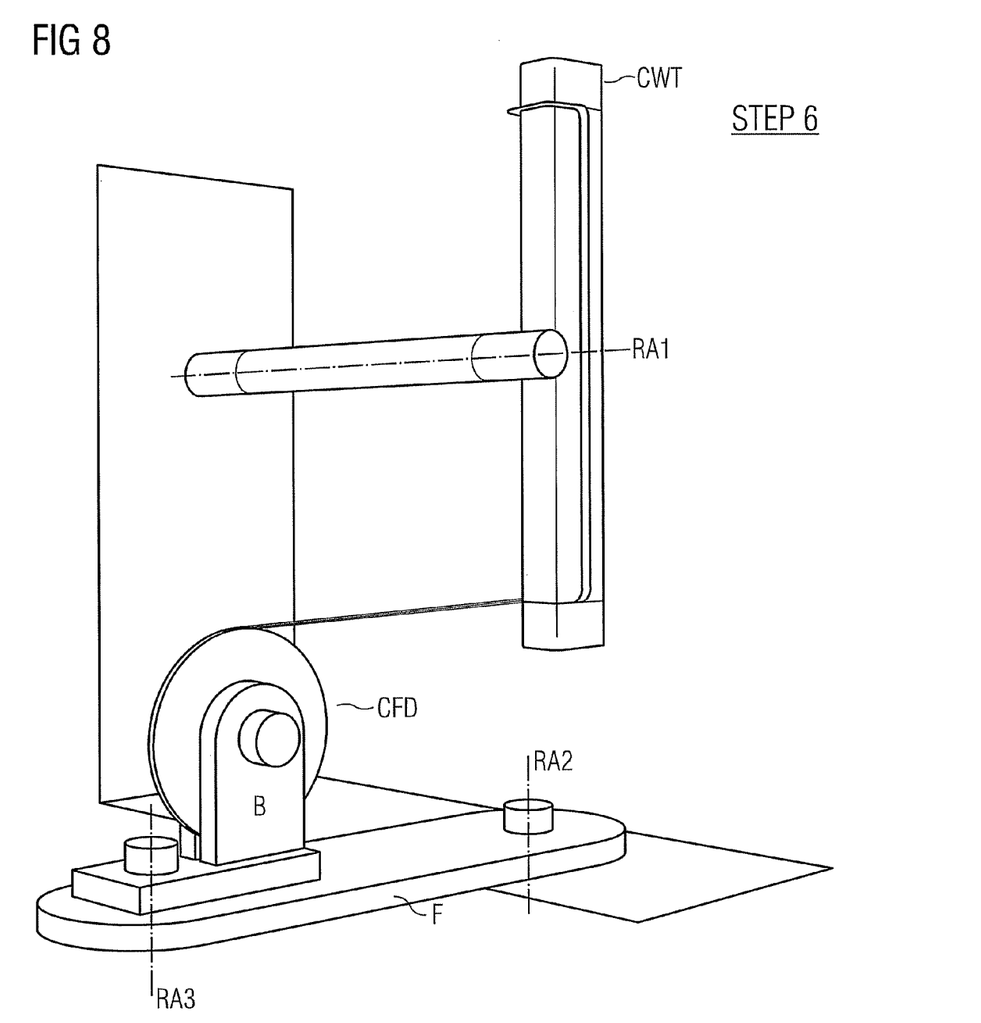

Referring to FIG. 8 a first part of the out-of-plane end-winding in an opposite end, relative to the end formed by the steps above, is formed by further actively turning the coil-winding-tool CWT around the first axis of rotation RA1 through a suitable arc.

The direction of this turning is the same as the direction of turning described in FIG. 4 and FIG. 5 above.

Figure 9:
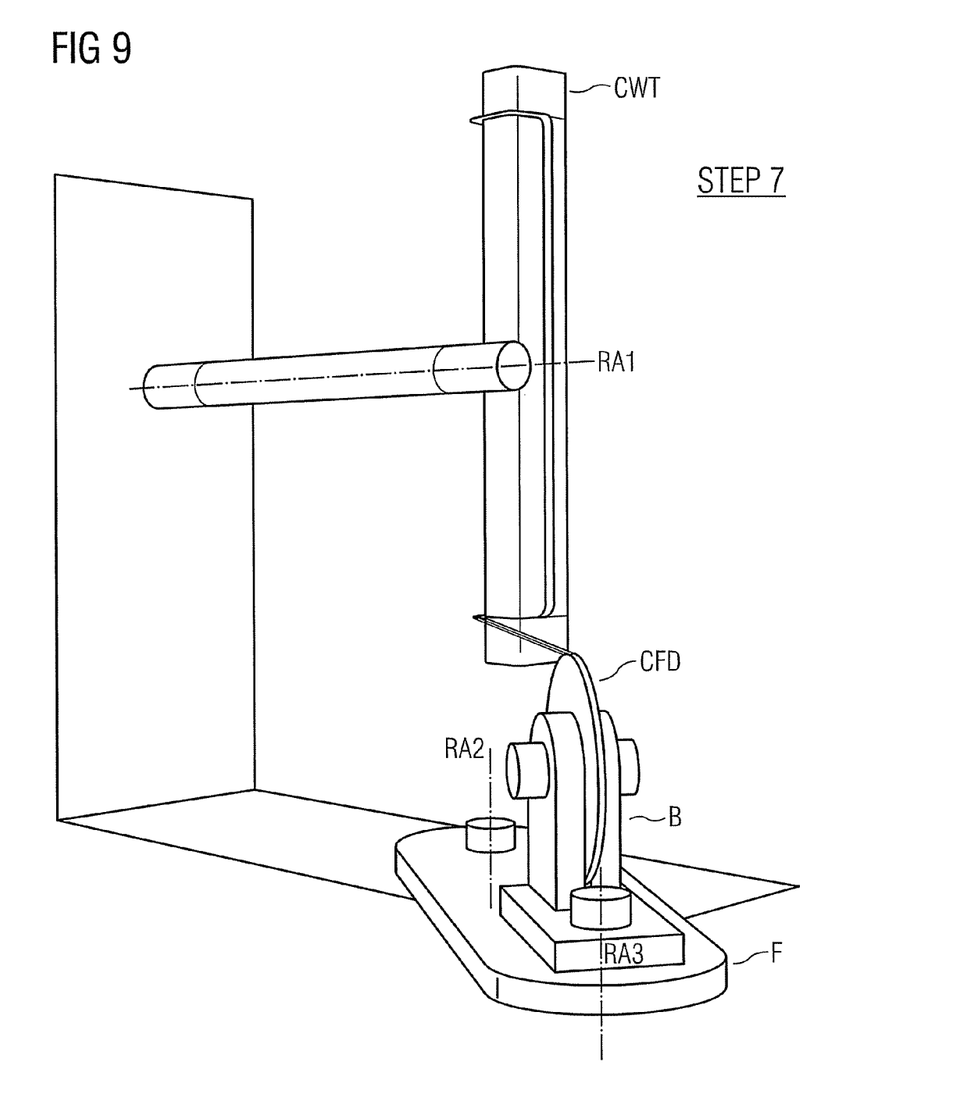
Figure 10:
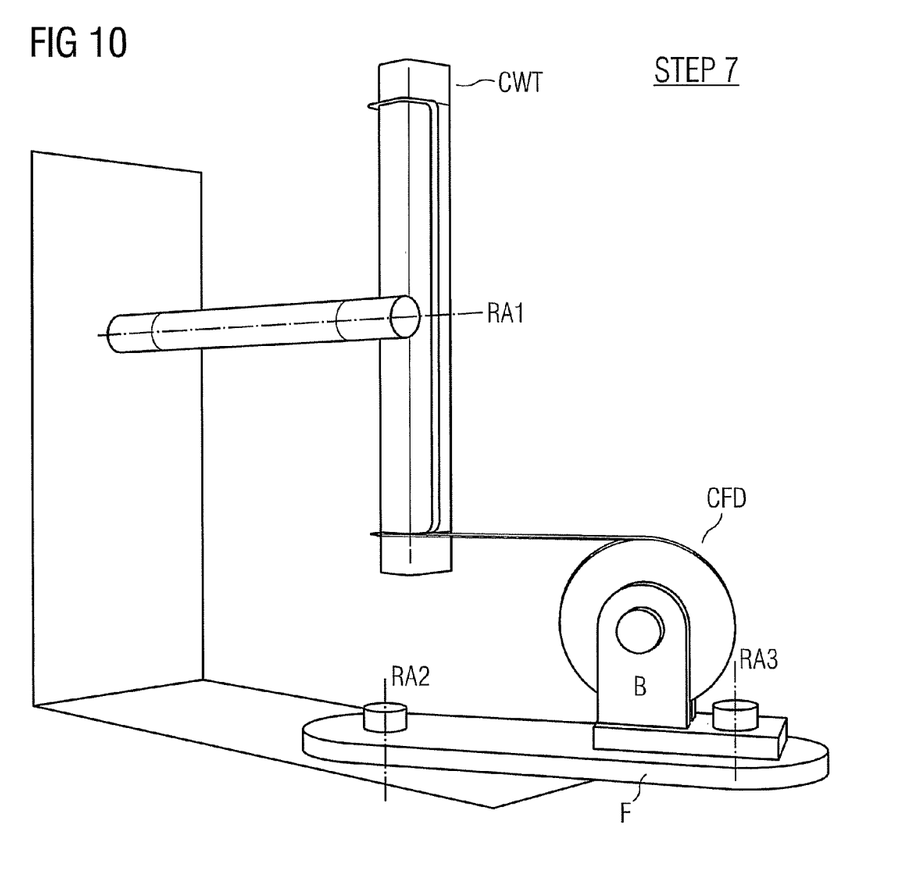
Figure 11:
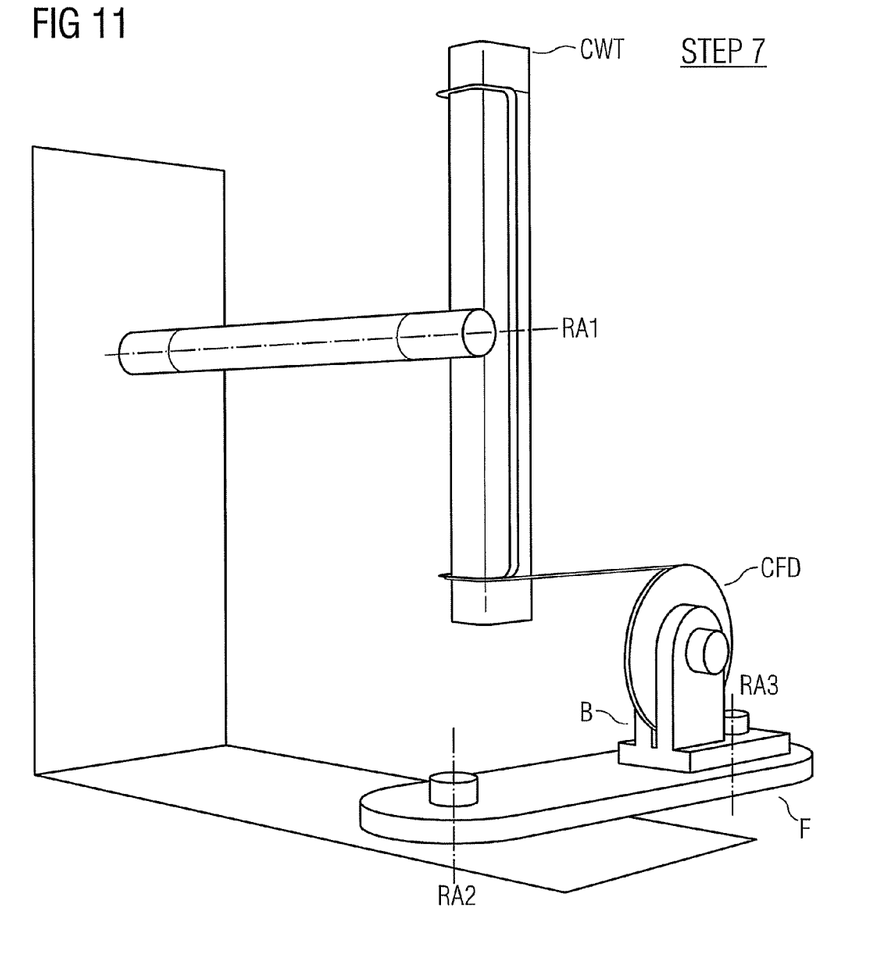

Referring to FIG. 9 to FIG. 11 a second part of the out-of-plane end-winding of the opposite end is formed by actively turning the conductor-feeding-drum CFD via the fixture F around the second axis of rotation RA2 through a suitable arc.

The direction of this turning is the same as the direction of the turning described in FIG. 3 to FIG. 5 above.

During this process the bracket B of the conductor-feeding-drum CFD passively adjusts around the third axis of rotation RA3.

Figure 12:
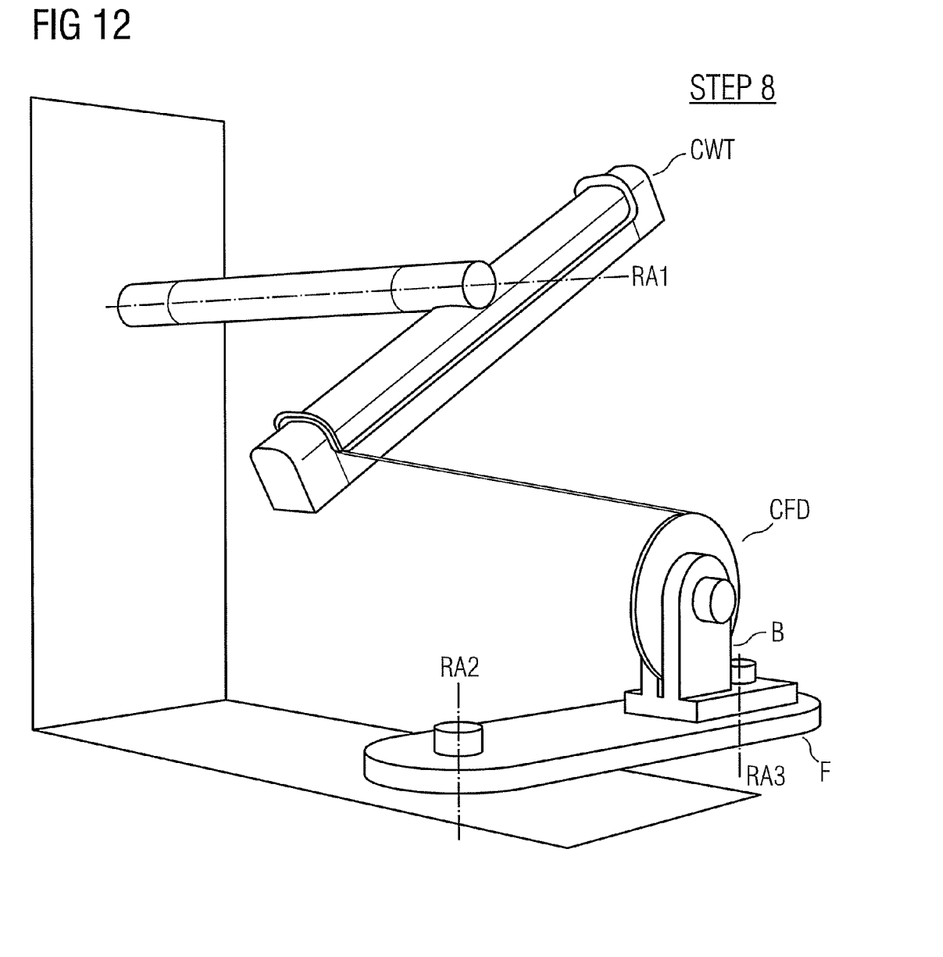

Referring to FIG. 12 a third part of the out-of-plane end-winding of the opposite end is formed by further actively turning the coil-winding-tool CWT around the first axis of rotation RA1 through a suitable arc.

The direction of this turning is opposite to the direction of the turning described in FIG. 7 above.

Figure 13:
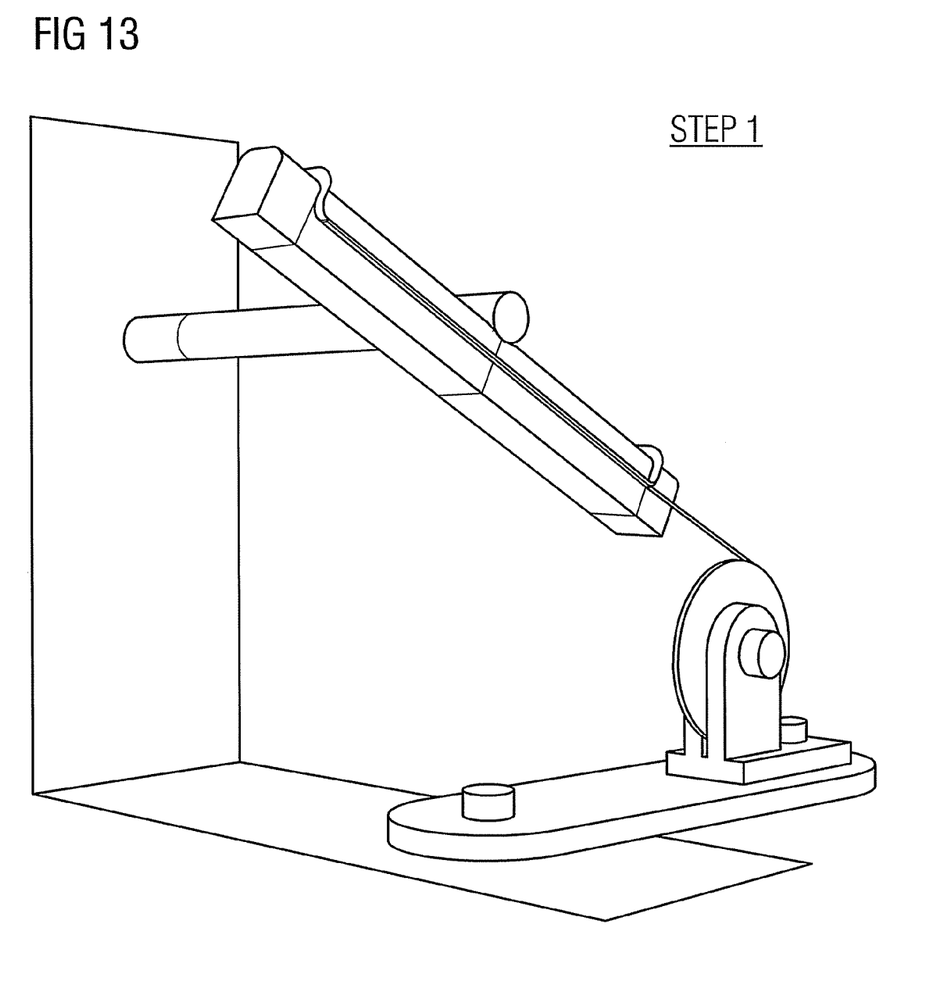

This is the end of the described winding-process. The start of a next winding, shown within FIG. 13, is the same as it is shown in FIG. 1 above.

In practice, the starting and finishing steps of the described winding-method is be determined by a desired location of the coil leads.

For end-windings that are bent out-of-plane by substantially 900 the rotation of the coil-forming-tool CFT described in steps STEP 1, STEP 2, STEP 4, STEP 6 and STEP 8 will in total be substantially two times 18°—a second 180° turn being in the opposite direction of a first 180° turn.

The rotation of the fixture F of the conductor-feeding-drum CFD described in steps STEP 3 and STEP 7 will in total be substantially two times 180°, a second 180° turn being in the same direction as a first 180° turn.

For end windings that are bent out-of-plane by an angle, which is substantially different from 90°, the rotation of the coil-winding-tool CWT described in steps STEP 1, STEP 2, STEP 4 up to STEP 6 and STEP 8 will in total be substantially two times of the double value of the out-of-plane angle.

A second half of a total turn again is in the opposite direction of a first half of the total turn.

The rotation of the fixture F of the conductor-feeding-drum CFD, described in steps STEP 3 and STEP 7, will again be in total substantially two times 180° degrees, a second 180° turn is in the same direction as a first 180° turn.

In either case the bracket B of the conductor-feeding-drum CFD will make small adjustment movements to accommodate the requirements of the coil-winding-tool geometry, including corrections for a coil pitch and a coil pitch angle.

During the entire process the metallic conductor MC is kept taut by either a tensioning device, a brake acting on the feeding-drum or similar devices.

During the various steps it is advantageous to make all turns a fraction longer than needed from purely geometrical reasons. This results in a compensation needed for elasticity and spring-back of the conductor.

For the same reason it is advantageous to introduce a brake to the conductor-feeding-drum to define an active rotation of the conductor-feeding-drum.

It is also possible to control the movement of the conductor, leaving the conductor-feeding-drum, by passive means. These means engage and slow down the movement, if the conductor is pulled from the drum during the coil-winding.

The invention claimed is:

1. An arrangement for winding a single-layer-coil, comprising:
    a mounted coil-winding-tool rotatable around a first axis of rotation and including a plurality of guides to guide a metallic conductor for the forming of at least a part of the single-layer-coil;
    a fixture rotatable around a second axis of rotation, which is perpendicular to the first axis of rotation; and
    a conductor-feeding-drum feeds the metallic conductor to the mounted coil winding-tool, the conductor-feeding-drum is arranged on the fixture to allow a rotation of the conductor-feeding-drum around the second axis,
    wherein a bracket is attached to the fixture, and
    wherein the conductor-feeding-drum is arranged on the fixture via the bracket.

2. The arrangement according to claim 1,
    wherein the coil-winding-tool includes a longitudinal axis, which is perpendicular to the first axis of rotation of the coil-winding-tool.

3. The arrangement according to claim 1,
    wherein a tensioning device or a brake is coupled with the conductor-feeding-drum to keep the metallic conductor taut while the metallic conductor is feed to the mounted coil-winding-tool.

4. A method for winding a single-layer-coil,
    providing an arrangement for winding a single-layer-coil according to claim 1
    feeding, by the conductor-feeding drum, a metallic conductor to the coil winding tool, which is rotatable around a first axis of rotation;
    guiding the feed metallic conductor via a guide on the coil winding tool;
    actively turning the coil-winding-tool around the first axis of rotation by a first arc in a first direction thereby forming a first side of the single-layer coil and forming, at a first end, a first part of an out-of-plane end-winding of the coil; and
    actively turning the conductor-feeding-drum around a second axis of rotation via a second arc after the forming of the first part of the out-of-plane end-winding thereby forming a second part of the out-of-plane end-winding of the coil.

5. The method according to claim 4, further comprising passively adjusting the conductor feeding drum by rotation around a third axis of rotation, which is parallel to the second axis of rotation.

6. The method according to claim 5, further comprising actively turning, after the forming of the second part of the out-of-plane end-winding of the coil, the coil-winding-tool around the first axis of rotation via a third arc in a second direction, which is opposite from the first direction.

7. The method according to claim 6, further comprising actively turning, after turning the coil-winding-tool around the first axis of rotation via a third arc, the coil-winding-tool around the first axis of rotation by a fourth arc in the first direction thereby forming a second side of the coil.

8. The method according to claim 7, further comprising actively, after forming the second side of the coil, turning the coil-winding-tool around the first axis of rotation through a fifth arc in the second direction thereby forming a first part of the out-of-plane end-winding at a second end which is opposite of the first end.

9. The method according to claim 8, further comprising actively turning the conductor-feeding-drum via the fixture around the second axis of rotation through a sixth arc thereby forming a second part of the out-of-plane end-winding of the opposite end.

10. The method according to claim 9, further comprising actively turning the conductor-feeding-drum via the fixture around the second axis of rotation through a sixth arc thereby forming a second part of the out-of-plane end-winding of the opposite end.

11. The arrangement according to claim 1,
wherein the mounted coil-winding-tool rotatable is mounted in such a way to be only rotatable around the first axis of rotation.

12. An arrangement for winding a single-layer-coil, comprising:
a mounted coil-winding-tool rotatable around a first axis of rotation and including a plurality of guides to guide a metallic conductor for the forming of at least a part of the single-layer-coil;
a fixture rotatable around a second axis of rotation, which is perpendicular to the first axis of rotation; and
a conductor-feeding-drum feeds the metallic conductor to the mounted coil winding-tool, the conductor-feeding-drum is arranged on the fixture to allow a rotation of the conductor-feeding-drum around the second axis,
wherein a bracket is attached to the fixture,
wherein the conductor-feeding-drum is arranged on the fixture via the bracket, and
wherein the bracket is attached to the fixture rotate around a third axis of rotation, which is parallel to the second axis of rotation in order to accommodate requirements of the geometry of the coil-winding-tool.

* * * * *